United States Patent Office 2,827,372
Patented Mar. 18, 1958

2,827,372

PROCESS OF EXTRACTING GOLD

John W. Britton, Lakefield, Ontario, Canada, assignor to Lakefield Research Limited, Lakefield, Ontario, Canada No Drawing. Application April 19, 1957
Serial No. 653,741

Claims priority, application Canada July 3, 1956

15 Claims. (Cl. 75—118)

This invention relates to a process for extracting gold from iron-containing gold-bearing materials including ores, concentrates and residues.

In the treatment of many gold-bearing materials such as ores, concentrates and residues by heretofore known methods, a considerable proportion of the gold is not recovered. This is particularly true of gold associated with such minerals as pyrite and arsenopyrite and other materials especially those containing sulphur, tellurium, arsenic, antimony or lead compounds.

It is common practice to concentrate, if necessary, and roast such materials and then dissolve out the gold, usually by treatment with a cyanide-containing solution. However, it is frequently found that a substantial proportion, for example from 10 to 20% of the gold remains undissolved after such treatment and the residues contain a valuable proportion of gold.

An object of this invention is to provide a process for recovering a high proportion of the gold from such residues.

A further object of the invention is to provide a method for the treatment of iron-containing gold ores and their concentrates whereby substantially higher recovery of gold is obtained in the subsequent cyanide or other dissolution extraction. The method not only increases the amount of gold capable of being extracted but also increases the rate of dissolution of the gold, decreases the consumption of reagents and reduces the capital and operating costs of the extraction plant.

As applied to the above described residues the invention resides in heating the residue from a roasted and subsequently cyanided iron-containing gold-bearing material to a temperature higher than the maximum roasting temperature to effect a structural change in the particles thereof and thereafter cooling and treating the cooled residue with a gold-dissolving reagent. It is believed that, prior to this thermal treatment, the gold is held in solid solution in the iron oxide and is incapable of being dissolved by normal methods; as a result of the thermal treatment a phase change takes place in the iron oxide whereby the gold is liberated in a form in which it is capable of being dissolved. If the residue contains appreciable amounts of unoxidized sulphur, arsenic, antimony, lead or tellurium compound it should first be roasted by any suitable method at a temperature from about 500 to 1600° F. before subjecting it to the thermal treatment described herein.

As applied to ores and concentrates the invention resides in roasting the iron-containing gold-bearing material and thereafter raising the temperature of the roasted material to a higher temperature than the roasting temperature to effect a structural change in the particles of the material. In treating such processed material to dissolve gold as by cyanidation it has been found that a substantially higher percentage of the total gold is recovered in a shorter period of time and with the consumption of less cyanide than has heretofore been possible by other methods.

The effective heating temperature for the treatment of said residues will vary according to the composition of the material being treated and will exceed 1000° F. It will be observed from the examples to follow that from 1100° F. to about 1750° F. the percentage yield of gold from the residue varies almost directly with the temperature. The yield begins to rise rapidly as the temperature is increased from 1750° F. to about 2000° F. Above this temperature the yield begins to fall but is still appreciable even at a temperature of 2400° F. The reduction in yield obtained at temperatures above 2000° F. is believed to be due to partial fusion of the material, which fusion tends to counteract the liberating effect of the higher temperature. Excessively high temperatures also cause wastage of fuel, increased wear on the furnace materials and loss of gold due to volatilization. The preferred temperature range therefore will usually be from 1650° F. to 2200° F. and more particularly within the range from 1800° F. to 2150° F.

The following examples illustrate typical results obtained by the method of the invention as applied to said residues.

*Example 1*

A sample of residue resulting from the roasting and cyanidation of a gold-bearing ore was placed in a refractory crucible which was covered with a loosely-fitting fireclay lid. The residue before treatment contained 0.75% arsenic, 0.13% antimony, 0.02% lead, 0.02% sulphur present as sulphide, and 0.126 ounces of gold per ton. The crucible was heated in a muffle furnace to a temperature of 1967° F. and was then removed and allowed to cool. The product was agitated for 24 hours with a solution of sodium cyanide and lime. The pulp was then filtered and the residue was washed. The solution was then assayed and the results showed that 41.6% of the gold in the original residue, equivalent to 0.052 ounces per ton had been extracted. At a mine treating 1000 tons of similar residue per day, the increased gold extraction resulting from the use of the new process would amount to 52 ounces per day. With gold at 35 dollars per ton, the value of this additional gold would exceed 1800 dollars per day.

*Example 2*

A sample of calcine residue containing 0.99% arsenic, 0.13% antimony, 0.52% lead, 0.71% sulphur present as sulphide, and 0.70 ounces of gold per ton, and resulting from the cyanidation of a roasted gold-bearing concentrate, was heated for 30 minutes at a temperature of 2012° F. in a refractory crucible which was covered by means of a loosely-fitting lid. At the end of the heating period the crucible was removed from the furnace and allowed to cool. The product had caked slightly during the treatment and was therefore crushed to pass a 65 mesh screen. It was then agitated for a period of 24 hours with a solution of sodium cyanide and lime. At the end of the cyanidation period the mixture was filtered and the residue was washed with water. An assay of the filtrate and washes showed that 67.6% of the gold, equivalent to 0.473 ounces per ton, had dissolved. At a mine treating say 100 tons of calcine per day, and with gold at 35 dollars per ounce, the value of the gold recovered by means of the present process would exceed 1600 dollars per day.

The following table shows the effect of the heat treatment of the same calcine residue at the temperatures indicated:

| Temperature during thermal treatment | Gold extracted by cyanidation | |
|---|---|---|
| | Percent | Ounces per ton |
| 1,112° F | 14.1 | 0.099 |
| 1,299° F | 20.0 | 0.140 |
| 1,472° F | 27.6 | 0.193 |
| 1,652° F | 34.1 | 0.239 |
| 1,742° F | 37.6 | 0.263 |
| 1,832° F | 48.3 | 0.338 |
| 1,922° F | 61.7 | 0.432 |
| 2,012° F | 67.6 | 0.473 |
| 2,102° F | 63.2 | 0.443 |
| 2,192° F | 42.3 | 0.296 |
| 2,282° F | 38.9 | 0.272 |
| 2,372° F | 38.9 | 0.272 |

The following are experimental results obtained during a study of the effect of certain variables on the gold extraction obtained from the same calcine residue. Although these results may be considered as typical they will not necessarily apply in the case of materials of different compositions.

EFFECT OF VARYING HEATING PERIODS

| Test No | N | M |
|---|---|---|
| Temperature | 2,012° F | 2,012° F |
| Time charge held at temperature | Nil | 30 minutes |
| Gold extraction | 70.0% | 72.6% |

EFFECT OF STIRRING DURING HEATING

| Test No | G | L |
|---|---|---|
| Temperature | 2,012° F | 2,012° F |
| Time held at temperature | 30 minutes | 30 minutes |
| Stirring | Nil | At 10 min. intervals |
| Gold extraction | 67.6% | 62.6% |

EFFECT OF DOUBLE TREATMENT

| Test No | N | N1* |
|---|---|---|
| Temperature | 2,012° F | 2,012° F |
| Time held at temperature | Nil | Nil |
| Gold extraction | 70.0% | 2.6% |
| Overall gold extraction | 70.0% | 72.6% |

EFFECT OF USING A PELLETIZED CHARGE

| Test No | G | M |
|---|---|---|
| Temperature | 2,012° F | 2,012° F |
| Type of charge | Powder | Pellets |
| Time held at temperature | 30 minutes | 30 minutes |
| Gold extraction | 67.6% | 72.6% |

*This test was carried out on the residue from test N.

EFFECT OF GRINDING

The residue from test M was ground to 95% minus 325 mesh and was recyanided. An additional recovery of 4.2% was obtained.

EFFECT OF COOLING AT DIFFERENT RATES

Test P—Fairly rapid cooling: crucible containing charge was removed from furnace and allowed to air-cool.
Test Q—Rapid cooling: the charge was quenched by pouring into water.
Test R—Slow cooling: the charge was left in the furnace and allowed to cool slowly.

| Test No | P | Q | R |
|---|---|---|---|
| Type of cooling | Fairly rapid | Rapid | Slow |
| Temperature | 1,967° F | 1,967° F | 1,967° F |
| Gold extraction | 60.9% | 55.9% | 57.6% |

From these results it may noted that optimum results were achieved when the residue was pelletized, held without agitation at the heating temperature for about 30 minutes, cooled fairly rapidly and finely divided before cyanidation.

In the treatment of ore, concentrate and other not previously roasted gold bearing material it is first roasted by any suitable method such as in a fluidized bed roaster or in an Edwards-type roaster. The roasting temperature may vary from about 500 to 1600° F. It is desirable that the material be roasted at a relatively low temperature initially and raised relatively slowly to a higher roasting temperature as is well established in the art. The roasting time will vary with the composition of material being roasted and with the temperature used, and will range from about 1 to 10 hours. It is preferable that the roast be conducted within from 1 to 4 hours and with a maximum roasting temperature between 900 and 1400° F.

The roasted material is then heated to a higher temperature in order to effect a physical change whereby that portion of the gold which cannot normally be dissolved is converted to a form in which it can be extracted by dissolution, for example in cyanide solution. It is believed that, prior to the high-temperature treatment, part of the gold is held in solid solution in iron oxide and is incapable of being dissolved by normal methods. As a result of the high temperature treatment a phase change takes place in the iron oxide whereby gold is liberated and rendered capable of being dissolved. It has been found that the gold extraction obtained in the subsequent dissolving step increases with increasing temperature up to a certain maximum extraction or optimum temperature beyond which decreased gold extractions are obtained. This optimum temperature varies with the composition of material being treated but is usually between 1650 and 2200° F. Above the optimum temperature, although the extraction is inferior to that obtained by heating at the optimum temperature, there is still a temperature range in which better extractions are obtained than can be obtained from calcine which has not been subjected to this process. Although the preferred temperature is within the range from 1650 to 2200° F., and more particularly within the range from 1800 to 2150° F., increased yields can be obtained by heating at any temperature between the maximum reached in the previous roasting process and 2200° F., and in the case of certain materials within the scope of this invention temperatures as high as 2400° F. will give increased yields as compared with those obtained without the use of this process.

The heated material is cooled and then treated to dissolve the gold. Currently cyanide in alkaline solution (usually lime) is normally used by chlorination or any other suitable extractive process may be used.

It has been found that grinding the heated and structurally changed material before cyanidation, as is shown in the examples below has a beneficial effect on the yield. The material is preferably finely divided so that at least 90% passes through a 200 mesh screen. Also pelletizing the charge of material before subjecting it to this heat treatment has a beneficial effect on the recovery. Holding the material at the heating temperature for a short period gives a somewhat increased yield. A second heat treatment and cyanidation gives a small increase in yield but would not be economical in all cases.

The following examples demonstrate the improved results obtained by using the new process on ores and concentrates:

*Example 3*

A sample of gold-bearing concentrate containing 20.78% sulphur, 10.72% arsenic, 0.85% antimony, 0.22% lead and 5.13 ounces of gold per ton was divided into equal parts, two of which were placed in fireclay dishes which were then transferred to a muffle furnace which had been preheated to 400° F. The temperature of the furnace was then raised slowly to 900° F. and maintained for 15 minutes, after which it was increased to 1300° F. The charges were rabbled at frequent intervals in order to ensure efficient oxidation. As soon as the temperature of 1300° F. had been reached, both dishes were removed. One was allowed to cool and the second dish was covered with a loosely-fitting fireclay lid and transferred to a second furnace held at a temperature of 1300° F. The temperature was raised to 1967° F. and the dish was then removed and allowed to cool. After taking a sample of each for analysis, the calcines were ground to 95% passing 325 mesh in the presence of a solution of sodium cyanide and lime and the pulps then agitated in open bottles on rollers for a period of 48 hours. At the end of this period the pulps were filtered and the washed residues were recyanided for two successive periods, each of 16 hours. The various cyanide solutions and final residues were then assayed for gold. Results of the tests were as follows:

|  | A (Product from normal roast) | B (Product from new method of treatment) |
|---|---|---|
| Assay of calcine before cyanidation, oz. gold/ton | 6.23 | 6.52 |
| Assay of final residue, oz. gold/ton | 0.652 | 0.345 |
|  | Percent of total gold in the calcine | |
| Gold extraction: | | |
| 1st period (48 hours) | 85.1 | 93.4 |
| 2nd period (16 hours) | 3.3 | 1.2 |
| 3rd period (16 hours) | 1.2 | 0.2 |
| Total (80 hours) | 89.6 | 94.8 |
| Sodium cyanide consumed (per ton of original concentrate), pounds | 2.30 | 1.52 |

Almost all the cyanide-soluble gold was dissolved in the first 48 hours' treatment of test B calcine, whereas an additional 16 hours was required to achieve a similar result in test A, thus demonstrating the higher rate of extraction obtained as a result of the new process.

Calculations show that, at a mine treating 100 tons of similar concentrate per day, the increase in gold extraction resulting from this improved method of treatment would amount to about 26 ounces per day. With gold valued at 35 dollars per ounce, that increased recovery would be worth more than 900 dollars per day.

*Example 4*

A sample of ore containing 3.25% sulphur, 1.73% arsenic, 0.13% antimony, 0.04% lead and 0.745 ounce of gold per ton was roasted in a muffle furnace, the temperature being raised gradually to 1000° F. The furnace was held at this temperature for 30 minutes and the temperature was then raised to 1300° F. After maintaining this temperature for 60 minutes the charge was allowed to cool slowly. The charge was stirred at frequent intervals during the roasting period. A sample of the calcine was analysed and was found to contain only 0.02% sulphide sulphur, showing that oxidation of the sulphides was virtually complete. A portion of the calcine was ground to approximately 95% minus 325 mesh and cyanided for a period of 70 hours; the pulp was filtered and the residue was washed with water before being dried and assayed. A further portion of the calcine was placed in a refractory crucible which was then covered with a loosely-fitting lid and heated in a furnace at a temperature of 1975° F. The crucible was then allowed to cool, after which the calcine was ground and cyanided under conditions similar to those used for treating the first sample. Results of the tests were as follows:

|  | C (Product from normal roast) | D (Product from new method of treatment) |
|---|---|---|
| Assay of calcine before cyanidation, oz./ton | 0.768 | 0.800 |
| Assay of cyanidation residue, oz./ton | 0.060 | 0.030 |
| Gold extraction, percent of total gold | 92.2 | 96.3 |
| Sodium cyanide consumed, lb./ton of ore | 0.34 | 0.14 |

These figures show that, for a mine treating 1000 tons per day of similar ore, the increase in gold recovery resulting from the use of the new process would amount to about 30 ounces per day. With gold at 35 dollars per ton, the value of the extra gold recovered would exceed 1000 dollars per day.

*Example 5*

A test was carried out as in Example 4, but the thermal treatment was done at 1800° F. instead of 1975° F. The comparative results were as follows:

|  | Heating Temperature | |
|---|---|---|
|  | 1,800° F. | 1,975° F. |
| Assay of calcine before cyanidation, oz./ton | 0.788 | 0.800 |
| Assay of cyanidation residue, oz./ton | 0.040 | 0.030 |
| Gold extraction (percent of total gold in calcine) | 94.9 | 96.3 |
| Sodium cyanide consumed (per ton of ore), pounds | 0.14 | 0.14 |

Similar comparative results of concentrate treatment are as follows:

|  | Heating Temperature | |
|---|---|---|
|  | 1,800° F. | 1,950° F. |
| Assay of calcine before cyanidation, oz./ton | 5.830 | 6.005 |
| Assay of cyanidation residue, oz./ton | 0.700 | 0.600 |
| Gold extraction, percent | 88.8 | 90.7 |
| Sodium cyanide consumed (per ton of original concentrate), pounds | 0.98 | 0.90 |

The examples illustrate the increase in yield which is obtained by this heat treatment of the roasted material. The increase is particularly striking when translated into dollars per day. Further the high rate of gold extraction enables smaller cyanidation plants to be used, thus effecting considerable savings in the capital and operating costs of the extraction plant. Additional savings also result from the reduction in cyanide consumption.

This application contains subject matter in common with my application Ser. No. 653,742 filed April 19, 1957.

What is claimed is:

1. In a process for removing gold from iron-containing gold-bearing material wherein the material is roasted and treated with gold-dissolving reagent, the steps of heating the residue from the gold-dissolving treatment to a temperature of at least 1650° F. but higher than the maximum roasting temperature, cooling the heated residue and retreating with gold-dissolving reagent.

2. The process defined in claim 1 wherein the residue is heated at a temperature not more than 2400° F.

3. The process defined in claim 1 wherein the residue is heated at a temperature not less than 1650° F. and not more than 2200° F.

4. The process defined in claim 1 wherein the residue is heated at a temperature not less than 1800° F. and not more than 2150° F.

5. In the removal of gold from iron-containing gold-bearing material wherein the material is roasted and treated with gold-dissolving reagent, the method which comprises pelletizing the residue from the gold-dissolving treatment, heating the pelleted residue to a temperature of at least 1650° F. but higher than the maximum roasting temperature, cooling the heated residue and treating it with a gold-dissolving reagent.

6. In the removal of gold from iron-containing gold-bearing material wherein the material is roasted and treated with gold-dissolving reagent, the method which comprises heating the residue from the gold-dissolving treatment to a temperature of at least 1650° F. but higher than the maximum roasting temperature, cooling and finely dividing the so heated residue to cause at least 90% of it to pass through a 200 mesh screen and treating it with a gold-dissolving reagent.

7. A process for treating unroasted iron-containing gold-bearing material which comprises roasting the material and immediately thereafter heating the roasted material at a temperature higher than that at which it was roasted and not less than 1650 nor more than 2400° F.

8. The process defined in claim 7 wherein the heating temperature is not more than 2200° F.

9. The process defined in claim 7 wherein the heating temperature is not less than 1800° F. nor more than 2150° F.

10. A process for treating unroasted iron-containing gold-bearing ores which comprises roasting the ore at a maximum temperature between 900 and 1600° F., immediately thereafter heating the roasted material to a temperature between 1650 and 2200° F. and treating the heated material to dissolve the gold therein.

11. A process as defined in claim 10 wherein the heated material is finely divided before dissolution treatment to such fineness that at least 90% will pass through a 200-mesh screen.

12. A process as defined in claim 11 wherein the roasted material is pelletized before heating.

13. A process for treating unroasted iron-containing gold-bearing materials which comprises roasting the material, pelletizing the roasted material, heating the pelletized material at a temperature between 1800 and 2150° F., finely dividing the cooled material to at least 200 mesh and treating the finely-divided material in cyanide solution.

14. A process as defined in claim 13 wherein the residue after cyanide treatment is heat-treated at a temperature higher than that used in the previous heat-treatment, but not greater than 2400° F., and treating the heat treated material with a cyanide-containing solution.

15. In the process of recovering gold from an iron-containing gold-bearing material involving roasting the material and thereafter leaching with a cyanide-containing solution, the improvement which consists in subjecting the material, subsequent to a roasting treatment, to heat treatment at a temperature within the range 1650°–2400° F.

References Cited in the file of this patent

UNITED STATES PATENTS

| | | |
|---|---|---|
| 360,904 | Parnell | Apr. 12, 1887 |
| 2,454,336 | Norwood | Nov. 23, 1948 |

FOREIGN PATENTS

| | | |
|---|---|---|
| 126,952 | Australia | Mar. 11, 1948 |
| 635,905 | Great Britain | Apr. 19, 1950 |